US008499782B2

(12) United States Patent
Bauer et al.

(10) Patent No.: US 8,499,782 B2
(45) Date of Patent: Aug. 6, 2013

(54) FLUID DELIVERY SYSTEM

(75) Inventors: Karl J. Bauer, Garner, IA (US); Michael A. Brainard, Manson, IA (US); William J. Bunkofske, Garner, IA (US); Steve C. Fairbanks, Cedar Falls, IA (US)

(73) Assignee: Oshkosh Corporation, Oshkosh, WI (US)

( * ) Notice: Subject to any disclaimer, the term of this patent is extended or adjusted under 35 U.S.C. 154(b) by 1071 days.

(21) Appl. No.: 11/604,670

(22) Filed: Nov. 27, 2006

(65) Prior Publication Data

US 2007/0186980 A1 Aug. 16, 2007

Related U.S. Application Data

(60) Provisional application No. 60/740,112, filed on Nov. 28, 2005.

(51) Int. Cl.
*E03B 11/00* (2006.01)
(52) U.S. Cl.
USPC .......... 137/267; 137/355.12; 137/899
(58) Field of Classification Search
USPC ............. 137/267, 125, 899, 255, 259, 351, 137/354, 355.12; 296/37.6; 220/562, 564; 280/830, 833, 838
See application file for complete search history.

(56) References Cited

U.S. PATENT DOCUMENTS

| 2,479,139 | A | * | 8/1949 | Seigel | 184/1.5 |
|---|---|---|---|---|---|
| 2,792,014 | A | * | 5/1957 | Granberg | 137/267 |
| 3,810,487 | A | * | 5/1974 | Cable et al. | 137/351 |
| 3,814,148 | A | * | 6/1974 | Wostl | 141/98 |
| 3,993,344 | A | * | 11/1976 | Bennett | 410/36 |
| 4,061,391 | A | * | 12/1977 | Violette | 410/68 |
| 4,714,196 | A | | 12/1987 | McEchern et al. | |
| 5,292,012 | A | * | 3/1994 | Davis et al. | 211/85.18 |
| 5,349,980 | A | * | 9/1994 | Spiegel | 137/1 |
| 5,499,674 | A | * | 3/1996 | Bartz et al. | 165/76 |
| 5,893,398 | A | * | 4/1999 | Garrett, Jr. | 141/231 |
| 6,006,971 | A | * | 12/1999 | Coleman et al. | 224/404 |
| 6,010,079 | A | | 1/2000 | Mayfield, Jr. | |
| 6,021,959 | A | | 2/2000 | Mayfield, Jr. | |
| 6,089,639 | A | | 7/2000 | Wojnowski | |
| 6,386,622 | B1 | | 5/2002 | Grimm et al. | |
| 6,422,642 | B1 | | 7/2002 | Grimm et al. | |
| 6,485,077 | B1 | | 11/2002 | Foster et al. | |
| 6,554,342 | B1 | | 4/2003 | Burnett | |
| 6,571,882 | B2 | * | 6/2003 | Yen | 169/24 |
| 6,575,524 | B2 | | 6/2003 | Grimm et al. | |
| 6,786,532 | B2 | | 9/2004 | McNally | |
| 6,817,653 | B2 | | 11/2004 | Ropp | |
| 6,880,875 | B2 | | 4/2005 | McClure et al. | |

(Continued)

*Primary Examiner* — Craig Schneider
*Assistant Examiner* — Kevin Murphy
(74) *Attorney, Agent, or Firm* — Foley & Lardner LLP

(57) ABSTRACT

A fluid delivery system for delivering at least one service fluid to at least one construction type equipment. The fluid delivery system includes a modular body including a main platform with a variety of different sizes of fluid vessels and at least one pump associated therewith. The fluid delivery system further includes hoses to facilitate the transfer of the fluids to construction equipment and hoses to facilitate the transfer of used fluids from construction equipment. A containment component is integrally formed with the modular body so as to provide the retaining of the fluid reservoirs during transit. An optional additional platform containing additional fluid vessels is capable of being attached to the front portion of the main platform, thereby increasing the total fluid storage capacity.

25 Claims, 7 Drawing Sheets

U.S. PATENT DOCUMENTS

| | | |
|---|---|---|
| 6,883,851 B2 | 4/2005 | McClure et al. |
| 6,915,860 B2 * | 7/2005 | Feller .............................. 169/43 |
| 6,955,385 B1 | 10/2005 | Boyer |
| 6,973,975 B1 * | 12/2005 | Adamson et al. ............... 169/24 |
| 7,055,880 B2 | 6/2006 | Archer |
| 7,070,227 B2 | 7/2006 | Hunt |
| 7,275,902 B1 * | 10/2007 | Klotz .............................. 410/42 |

* cited by examiner

FLUID DELIVERY SYSTEM

CROSS-REFERENCE TO RELATED PATENT APPLICATIONS

This application claims priority from Provisional Application U.S. Application 60/740,112, filed Nov. 28, 2005, incorporated herein by reference in its entirety.

BACKGROUND OF THE INVENTION

This invention is directed to a fluid delivery system and more particularly, to a modular truck body for the delivery of fluids by a system of tanks and pumps to mobile construction equipment.

Mobile truck bodies are typically modular in design and are implemented in a wide variety of embodiments. Such truck bodies are generally task specific, with a different truck body affixed to a chassis reflecting the task for which the body is designed. For example, a mechanic truck body is capable of including a variety of compartments to hold tools, equipment, replacement parts, air compressors, pneumatic tools and hoses, and the like. Similarly, an electrician truck is capable of including a variety of compartments containing equipment, tools, hydraulic lifts, and the like. Current truck bodies lack the ability to provide a variety of servicing fluids, such as grease, oil, antifreeze, and the equipment necessary to contain and pump such servicing fluids. Also, available truck chassis of different classes have a wide range of cab to axle/trunnion. Current truck bodies are not adapted to conform to truck chassis classes of different types and sizes. Also, current truck bodies do not include means for preventing leakage of servicing fluids during their transportation, nor do they include suitable means for securing fluid vessels in the truck body.

Thus, there is a need for a fluid delivery system capable of providing a variety of servicing fluids via a mobile truck body. In addition, there is a need for a fluid delivery system capable of preventing leakage of servicing fluids during their transportation. There is also a need for a fluid delivery system for delivering a plurality of service fluid reservoirs adapted to conform to truck chassis classes of different types and sizes. There is also a need for a fluid delivery system that includes means for securing fluid vessels in the truck body.

SUMMARY OF THE INVENTION

There is provided a fluid delivery system for the delivery of fluids by a system of tanks and pumps to mobile construction equipment.

Still further, there is provided a fluid delivery system capable of providing a variety of servicing fluids via a mobile truck body to at least one construction type equipment.

Yet further, there is provided a fluid delivery system capable of preventing leakage of servicing fluids during their transportation.

Yet further, there is provided a fluid delivery system that includes means for securing fluid vessels in the truck body.

There is provided a fluid delivery system comprising a modular body that includes a main platform configured to orientate along a plane generally parallel to a chassis plane of an associated vehicle. The modular body also includes securing structure configured for securing a plurality of rectilinear fluid vessels along a surface of the platform. The plurality of vessels are secured such that at least one face of each of the plurality of vessels is substantially coextensive with a complementary face of at least a second vessel of the plurality. The securing structure also includes a plurality of support members secured generally perpendicularly to the platform. Each support member suitably extends along at least one edge of a corresponding one of the fluid vessels. The securing structure further includes at least one rail portion that is generally perpendicular to the support structure and is oriented along a surface of at least one of the plurality of fluid vessels so as to provide support to the fluid vessels.

A vehicle including a vehicle body support structure. A plurality of surface engaging support member coupled to the vehicle body support structure. A modular body coupled to the vehicle body support structure, the modular body configured to orientate along a plane generally parallel to a chassis plane of the vehicle body support structure. A fluid delivery system coupled to the modular body, the fluid delivery system. The fluid delivery system includes a securing structure configured to secure a plurality of rectilinear fluid vessels along a surface of the main platform such that at least one face of each of the plurality of vessels is substantially coextensive with a complementary face of at least a second of the plurality thereof. The securing structure including a plurality of support members secured generally perpendicularly to the main platform, each support member extending along at least one edge of a corresponding one of a the fluid vessels, the securing structure further including at least one rail portion generally perpendicular to the support members and oriented along a surface of at least one of the plurality of fluid vessels so as to provide support thereto.

Other aspects of the present invention will become rapidly apparent to those skilled in this art from the following description wherein there is shown and described a preferred embodiment of this invention, simply by way of illustration of one of the best modes suited for to carry out the invention. As it will be realized by those skilled in the art, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the fluid delivery system, and together with the description serve to explain the principles of the system. In the drawings.

DETAILED DESCRIPTION OF THE PREFERRED EMBODIMENTS

There is disclosed a fluid delivery system. In particular, a fluid delivery system for the delivery of fluids by a system of tanks and pumps to mobile construction equipment. More particularly, there is provided a system and truck body for delivering multiple service fluids to at least one construction type of equipment. It will be appreciated by those skilled in the art that the fluid delivery system, is suitably adapted to be affixed, for example, but without limitation, to class six, class seven, or class eight truck chassis ranging from 84 inches to greater than 148 inches cab to axle/trunnion. It is also contemplated that the fluid delivery system can be coupled to a platform, for example a trailer that is moved to a construction site.

Figure 1:
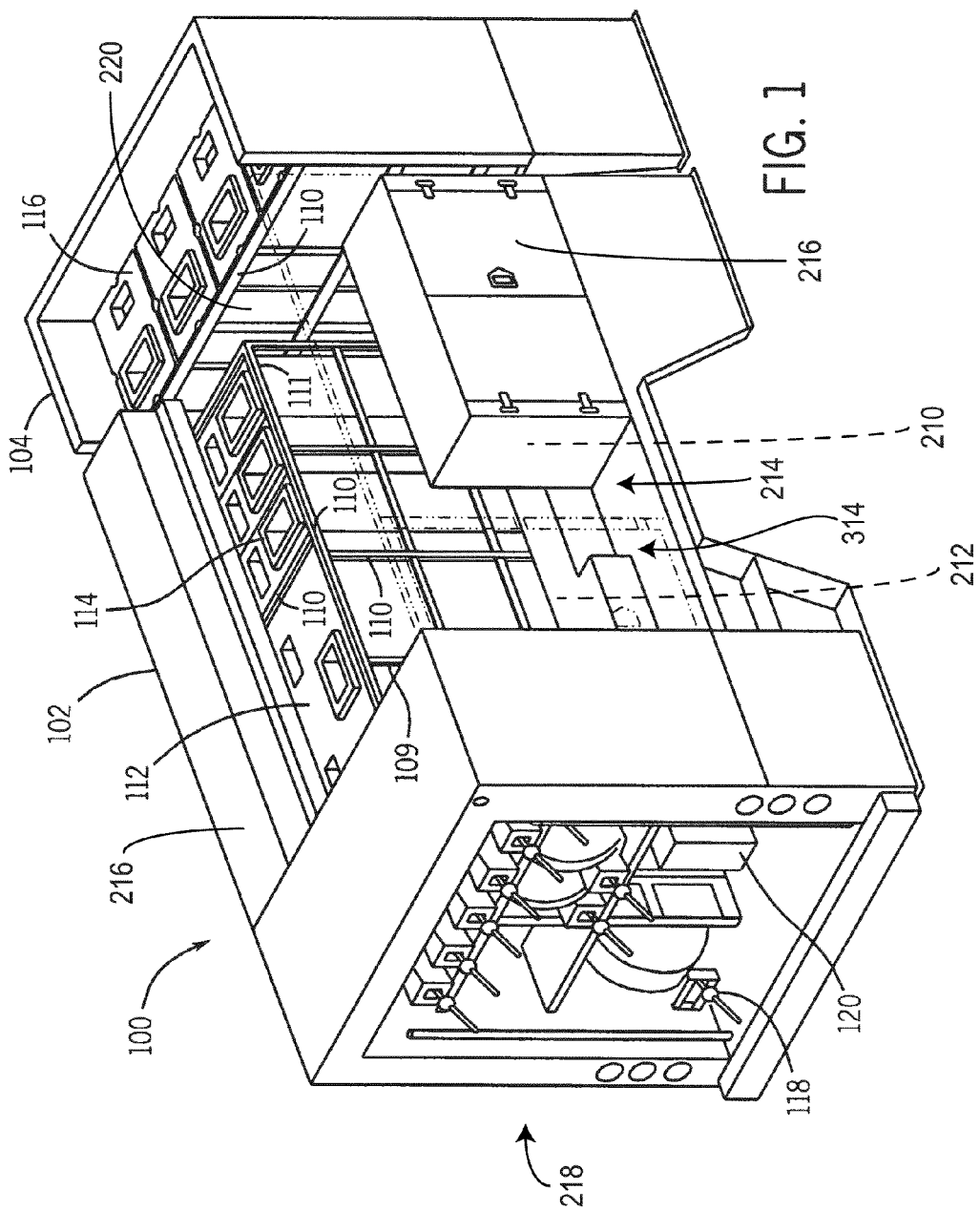
FIG. 1 is an isometric view of a truck body including an exemplary embodiment of a fluid delivery system.

Turning now to FIG. 1, there is shown an isometric view of a body 100 for affixation to a truck chassis (not shown) in accordance with the present invention. As illustrated in FIG. 1, the body 100 includes a main platform 102 and a removable platform 104. Those skilled in the art will appreciate that the removable platform 104 is shown for example and illustration purposes only and the instant body 100 is capable of implementation with and without the removable platform 104. It will be understood by those skilled in the art that the side panels 210 and door 212 have been rendered transparent so as to provide a better view of the interior 214 of the body 100. In accordance with one aspect, the main platform 102 further includes a plurality of externally accessible compartments 216, suitably configured to receive and store various tools, implements, components, parts, and the like.

The main platform 102 further includes a plurality of fluid vessels, or tanks, illustrated in FIG. 1 as tanks of two different sizes. Tank 112 is suitably illustrated as a large fluid reservoir, containing, for example and without limitation, oil, hydraulic fluid, antifreeze, used oil, used antifreeze, and the like. Tanks 114 are illustrated as small than tank 112 and are suitably capable of storing, for example and without limitation, oil, hydraulic fluid, antifreeze, used oil, used antifreeze, and the like. It will be appreciated by those skilled in the art that the use of tanks 112 and 114 are for illustration purposes only, and other sized tanks or a single tank are equally capable of being used. The skilled artisan will appreciate that the number of tanks 112, 114 comprised in the main platform 102 is based upon the type of chassis to which the body 100 is to be affixed, as well as the size of the fluid tanks 112, 114 to be used. In the preferred embodiment, the storage tanks 112 and 114 are comprised of polyethylene, however the skilled artisan will appreciate that other materials are capable of being used in the construction of such tanks. The skilled artisan will further understand that while not shown in FIG. 1, the body 100 further includes a variety of pumps, configured to pump fluids into construction equipment or to suction used fluid out of such construction equipment.

The main platform 102 also incorporates an integrated fluid vessel containment component 110. The containment component 110 serves as a securing structure and includes a plurality of support members 109 secured generally perpendicularly to the main platform 102. Each support member 109 suitably extends along at least one edge of a corresponding one of the fluid vessels, which are illustrated in FIG. 1 as tanks 112, 114. The securing structure further include rail portions 111 that are generally perpendicular to the support members 109. The rail portions 111 are oriented along a surface of at least one of the plurality of fluid vessels so as to provide support to the fluid vessels. As will be appreciated by those skilled in the art, the containment component 110 is comprised of any suitable material known in the art capable of maintaining the position of fluid tanks 112, 114 during transit and at rest. Preferably, the containment component 110 is comprised of aluminum, steel, or other metal having suitable structural integrity. Other materials such as a composite and engineered plastic can also be used. More preferably, the containment component 110 is integral to the body 100, such that the structures of the body 100 and the containment component 110 are suitably joined and/or formed of the same base components. For example, the left-hand compartment 216 suitably functions as a portion of the containment component 110.

The main platform 102 further includes transfer conduits, illustrated in FIG. 1 as hoses 118 disposed on reels at the rear of the body 100. As shown, the body 100 includes a plurality of hoses 118, wherein each hose 118 is preferably configured to convey or retrieve fluids with respect to an individual tank 112, 114. The skilled artisan will appreciate that the hoses 118, as referenced herein, are comprised of a material suitable to the long term handling of service fluids. Furthermore, the hoses 118 are operatively coupled to respective pumps (not shown) so as to facilitate the movement of fluid through the hoses 118. As will be understood by those skilled in the art, the pumps (not shown) are capable of being implemented in the form of pneumatic pumps, hydraulic pumps, or electric pumps or any combination thereof. To facilitate the control of the various implements of the body 100, a control panel 120 is suitably affixed to the rear of the main component 102 so as to provide a user with the ability to control the implements without requiring the user to enter the main platform 102 itself.

Figure 4:
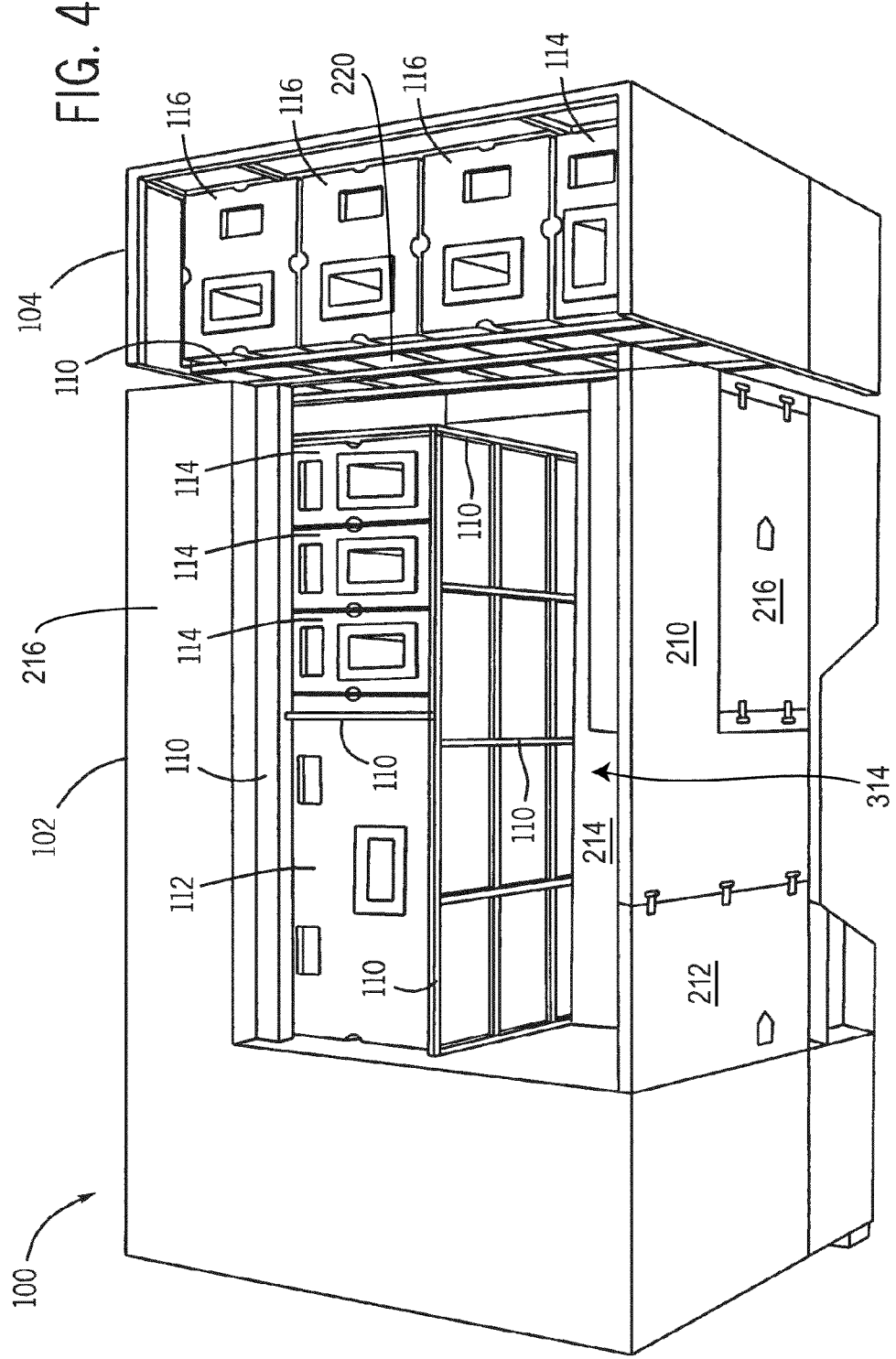
FIG. 4 is an isometric to aspect view of the integrated reservoir containment of the fluid delivery system illustrated in FIG. 1 in a truck body.
Figure 5:
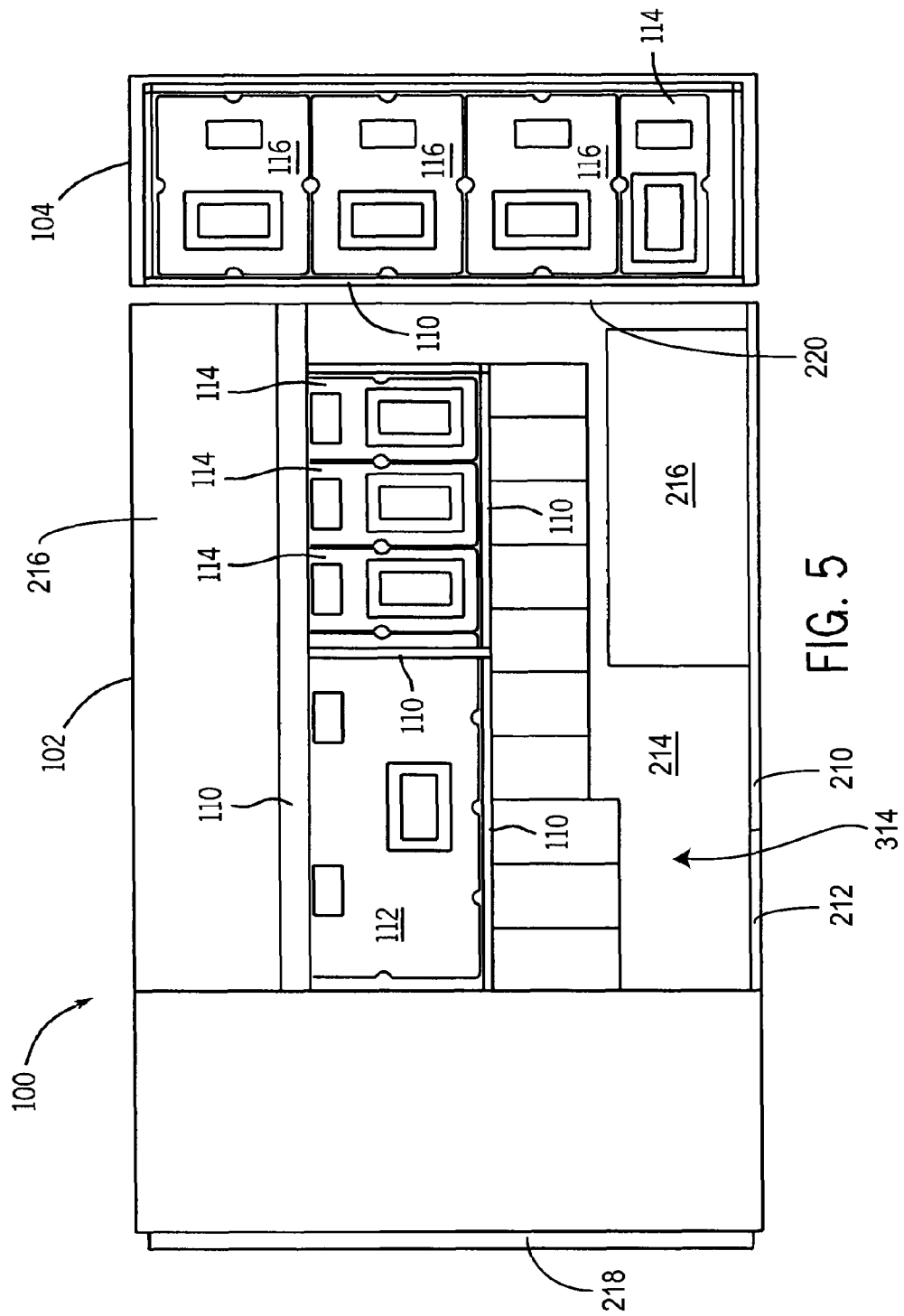
FIG. 5 is a top view of the reservoirs of the fluid delivery system illustrated in FIG. 1 in a truck body.

The body 100 further comprises the additional removable platform 104. As illustrated in FIG. 1, the additional platform 104 includes, but is not limited to, at least one fluid vessel or tank 116. The skilled artisan will appreciate that the number of fluid tanks 116 in the additional platform 104 is based upon the type of chassis to which the body 100 is to be affixed, as well as the size of the fluid tank 116 to be used. The additional platform 104 can be joined to the front of the main platform 102 via any means known in the art. Preferably, the interior, i.e., storage tanks 116, of the additional platform 104 is accessible through the main platform 102 via an open section at the front of the main platform 102 (see also walkway 314 as shown in FIGS. 1, 4, and 5). As depicted in FIG. 1, the additional platform 104 further includes an integrated containment component 110, suitably adapted to retain the storage tanks 116 residing therein. A skilled artisan will appreciate that the additional platform 104 is not limited to one integrated containment component 110. The number and variety of integrated containment components 110 comprised in the additional platform 104 suitably depends on customer needs and/or services being provided. It will also be appreciated by those skilled in the art, that the containment component 110 included in the additional platform 104 suitably includes support structure analogous to those included in the containment component 110 of the main platform 102.

Figure 2:
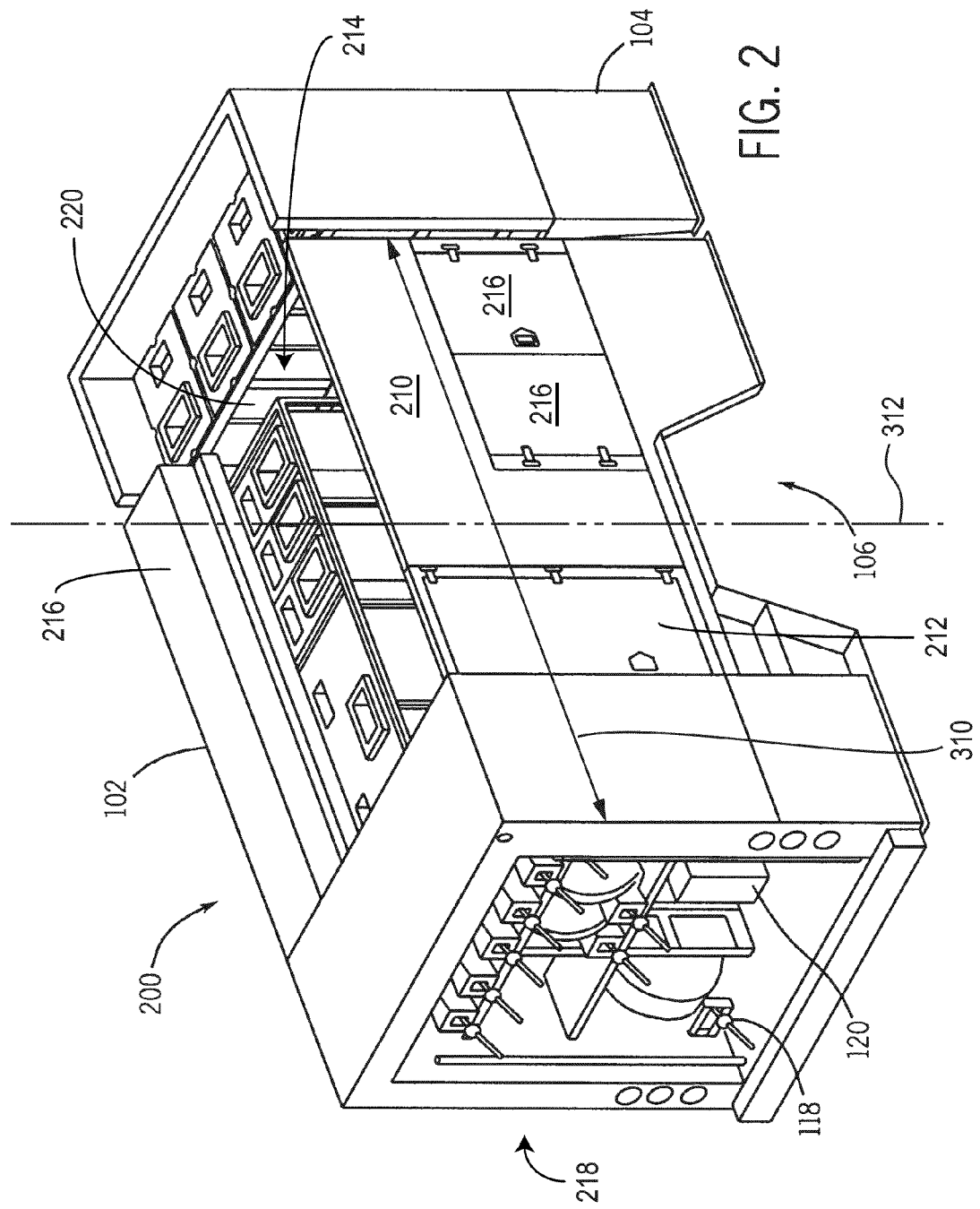
FIG. 2 is an isometric view of a truck body for a single rear axle chassis including the fluid delivery system illustrated in FIG. 1.

Referring now to FIG. 2, there is shown a truck body 200 configured for attachment to a single rear axle chassis, as denoted by the wheel well opening 106 (see also length 310 of main platform 102 and lengthwise centerline 312 as shown in FIG. 2). As illustrated in FIG. 2, the truck body 200 includes a main platform 102 and an additional platform 104. As explained above with respect to FIG. 1, the main platform 102 includes various externally accessible compartments, containment components, hoses, fluid reservoirs, pumps, control panel, the like. Similarly, the additional platform 104 includes a containment component, reservoir tanks, and the like.

Figure 3:
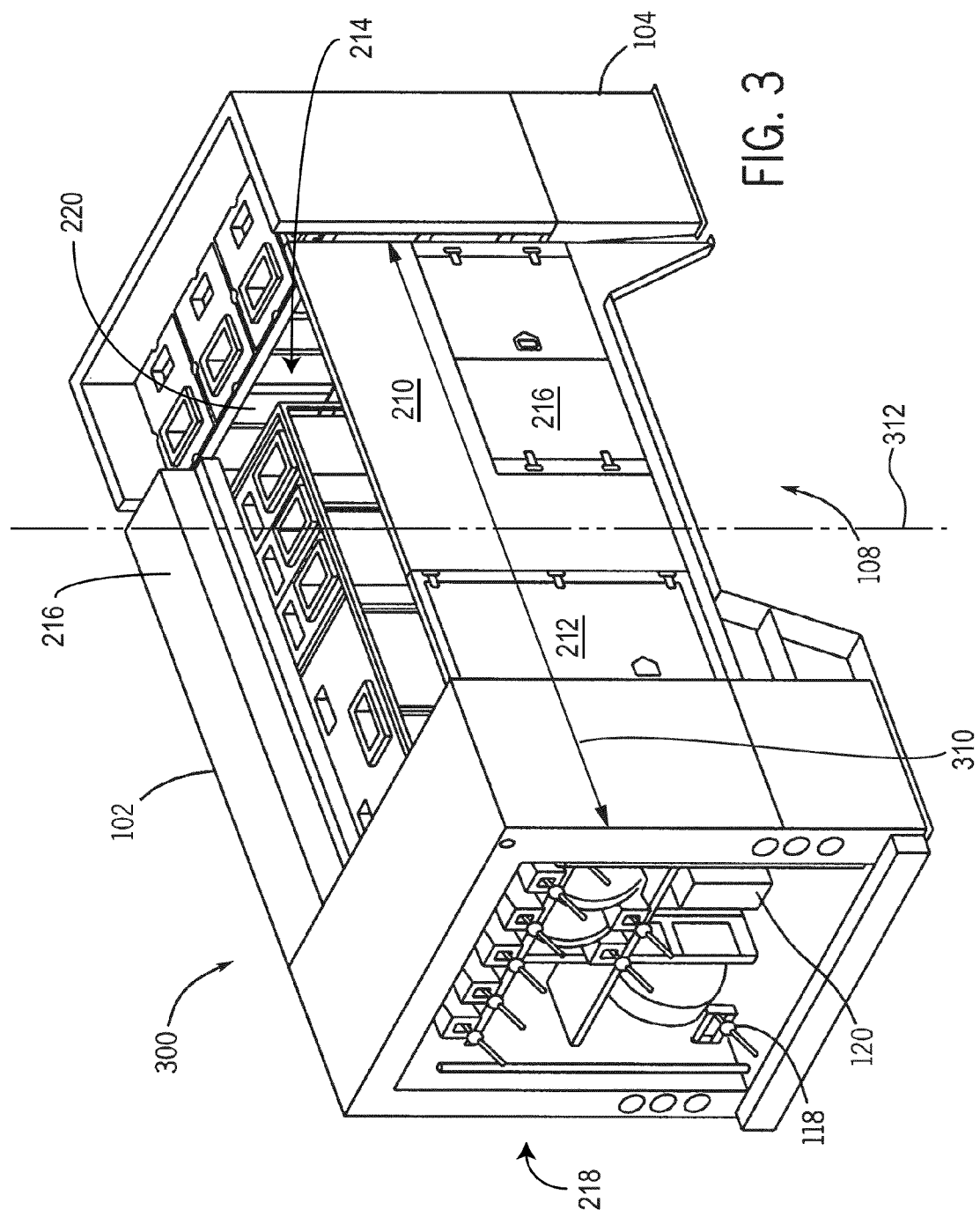
FIG. 3 is an isometric view of a truck body for a dual rear axle chassis including the fluid delivery system illustrated in FIG. 1.

Turning now to FIG. 3, there is shown a truck body 300 configured for attachment to a dual rear axle chassis, as denoted by the wheel well opening 108 (see also length 310 of main platform 102 and lengthwise centerline 312 as shown in FIG. 3). The skilled artisan will understand that, other than the wheel well opening and additional space corresponding thereto, the main platform 102 and the additional platform 104 of FIG. 3 have no appreciable differences from that of the body 100 of FIG. 1 and the truck body 200 of FIG. 2.

FIG. 4 provides a detailed view of the containment component 110 used to retain the fluid tanks 112, 114 and 116, in the main platform 102 and the additional platform 104 of the body 100. Preferably, the containment component 110 is comprised of tubular metal, or high-density plastic, so as to prevent shifting of the fluid tanks 112, 114, and 116 during transit.

FIG. 5 provides a detailed view of the total amount of fluid reservoirs 112, 114, 116 storage area. The fluid tanks 112, 114, and 116 are available in several sizes depending on the user's selection. The configuration of the body 100, as illustrated in FIG. 5, allows for a maximum of eight reservoirs on the main platform 102 and six reservoirs on the optional front platform 104. The skilled artisan will appreciate that number of reservoirs, as well as their disposition presented in FIG. 5 are for illustration purposes only and is not limited to the arrangement shown in FIG. 5. In one particular embodiment, the main platform 102 further includes a 120 pound grease barrel and pump assembly.

Figure 6:
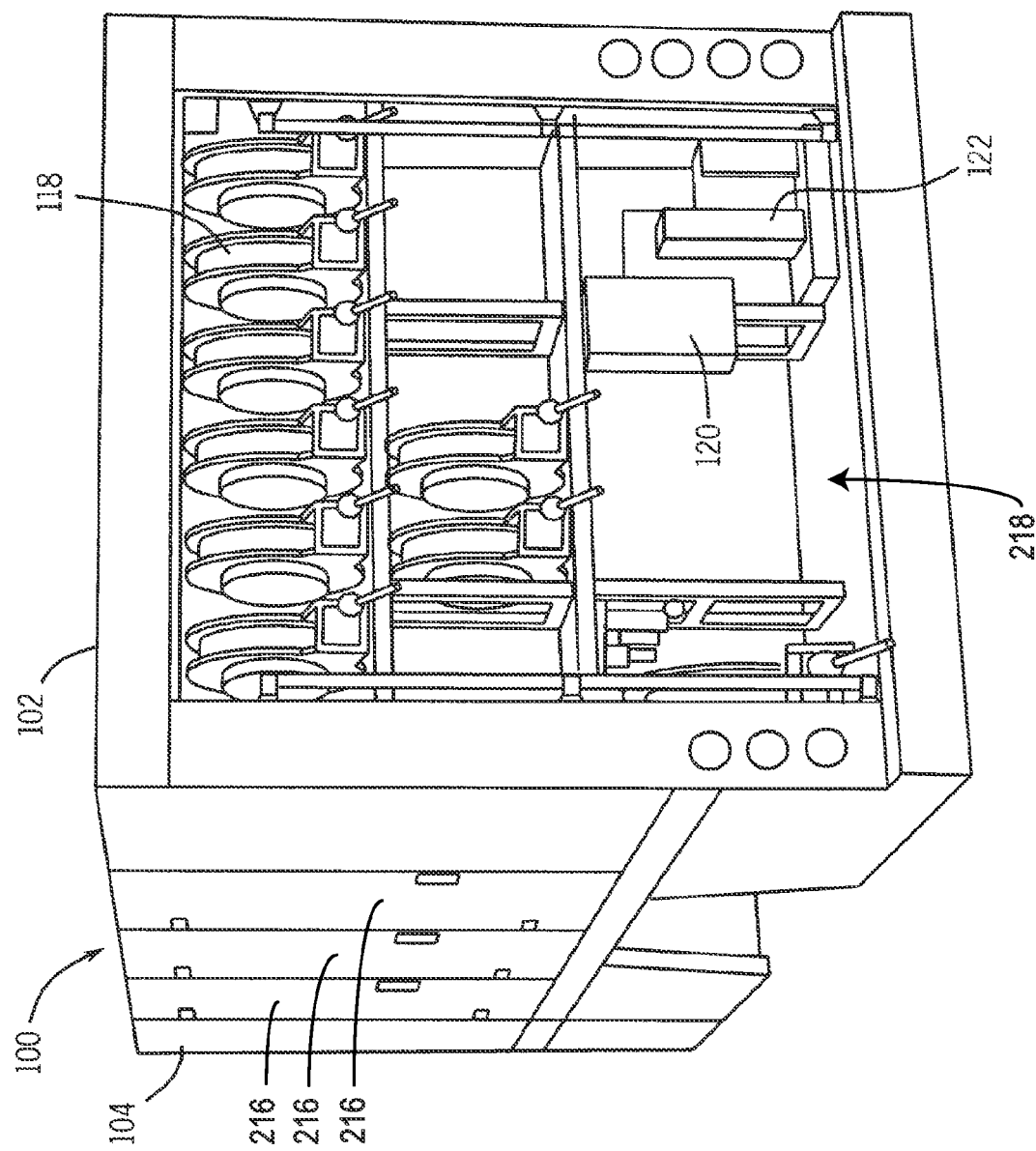
FIG. 6 is an isometric rear aspect view of the truck body illustrated in FIG. 1 including the fluid transfer apparatus and associated controls.

FIG. 6 provides a detailed view of the rear of the main platform 102 of the body 100. As shown in FIG. 6, the exterior of the rear of the main platform 102 includes a plurality of hoses 118 for transferring fluid to construction equipment (not shown), as well as hoses 118 for retrieval of used fluid from construction equipment. The hoses typically are coupled to reels to facilitate use and storage. Pumps 122 are illustrated for example purposes only and other pumps are capable of being mounted externally and/or internally. As previously discussed the rear of the main platform 102 incorporates a control panel 120, suitably adapted to facilitate the control of the various implements available to a user on the body 100.

Figure 7:
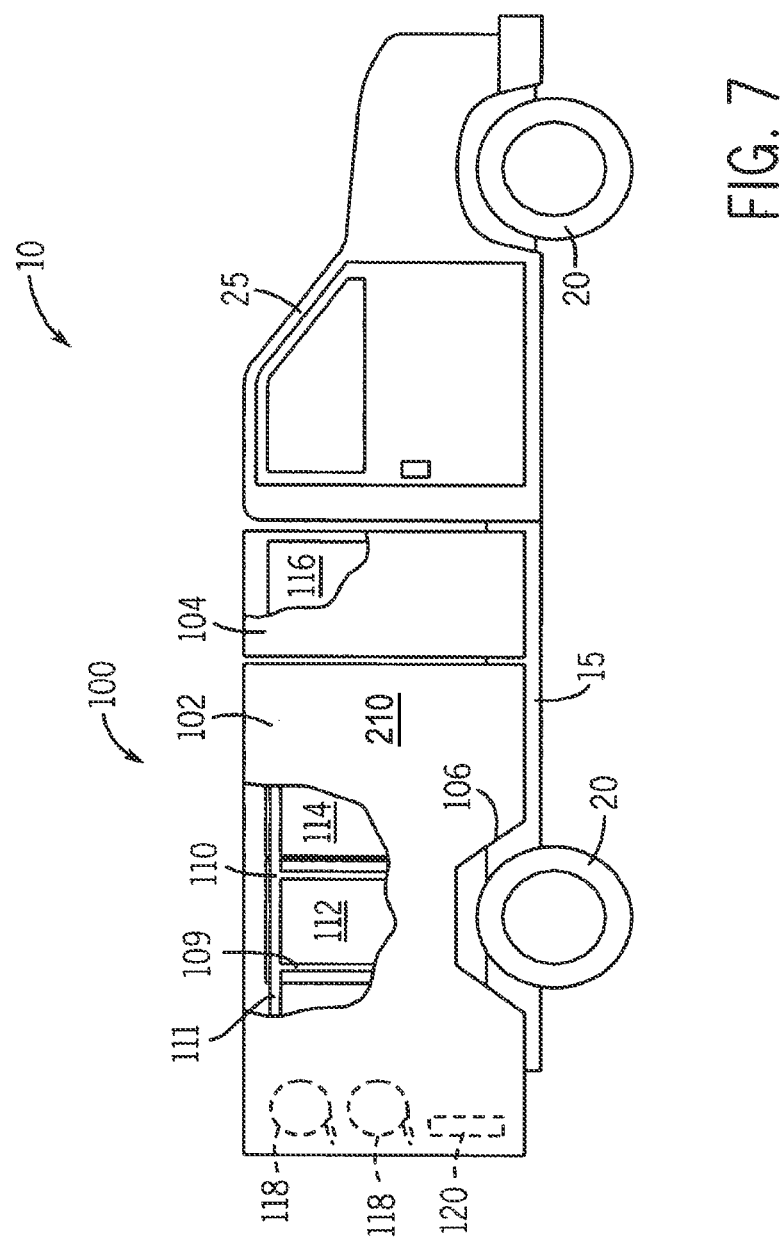
FIG. 7 is a side elevation view of a vehicle 10 is shown according to an exemplary embodiment including the fluid delivery system illustrated in FIG. 1.

Referring to FIG. 7, a vehicle 10 is shown according to an exemplary embodiment including a fluid delivery system as described above. Vehicle 10 is a truck that includes a body 100, a support structure 15 (e.g., frame, bed, platform, chassis, etc.), one or more support members 20, and a cab 25. According to various exemplary embodiments, support members 20 may be wheels, tracks, or any other members that are in communication with both the ground and the support structure 15. Support structure 15 provides a structure to which body 100 and cab 25 are coupled. Cab 25 provides a compartment for one or more occupants where one of the occupants is a driver. Body 100 contains tanks 112 and 114, hoses 118, and a shelving system 110. While vehicle 10 is shown as a truck with a single rear axle, it should be understood that vehicle 10 may have more than one rear axle. According to other exemplary embodiments, vehicle 10 may not be self-propelled and may be a platform, trailer or other structure that is towed or otherwise propelled by a truck.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of exemplary embodiments has been presented for purposes of illustration and description. It is not intended to be exhaustive or to limit the fluid delivery system to the precise form disclosed. Obvious modifications or variations are possible in light of the above teachings. The embodiment was chosen and described to provide the best illustration of the principles of the fluid delivery system and its practical application to thereby enable one of ordinary skill in the art to use the invention in various embodiments and with various modifications as are suited to the particular use contemplated. All such modifications and variations are within the scope of the fluid delivery system as determined by the appended claims when interpreted in accordance with the breadth to which they are fairly, legally and equitably entitled.

What is claimed is:

1. A fluid delivery system, comprising:
a modular body configured to be fastened to a chassis of a vehicle, the modular body comprising:
a main platform covering a portion of the chassis; and
an auxiliary platform connecting to a front portion of the main platform and configured to substantially cover a remaining portion of the chassis between the main platform and a cab of the vehicle;
a securing structure supporting fluid vessels along a surface of the main platform, wherein the securing structure comprises support members secured to the main platform, and wherein each of the support members extends along a corresponding one of the fluid vessels, and wherein the auxiliary platform supports additional fluid vessels;
fluid transfer apparatuses associated with the fluid vessels; and
pumps associated with the fluid transfer apparatuses to facilitate movement of fluid through the fluid transfer apparatuses, wherein the pumps and the fluid transfer apparatuses pump fluids out of one of the fluid vessels; and wherein the pumps and the fluid transfer apparatuses suction used fluids into another of the fluid vessels;
wherein the main platform comprises a wheel well opening for rear wheels of the vehicle, wherein the wheel well opening is positioned such that a lengthwise center of the main platform is configured to be positioned over the rear wheels of the vehicle.

2. The fluid delivery system of claim 1, wherein the modular body is configured to be fastened to a single rear axle chassis and a dual rear axle chassis, without imparting appreciable differences in the modular body other than changing a wheel well opening and space corresponding thereto.

3. The fluid delivery system of claim 1, wherein use of the auxiliary platform in conjunction with the main platform allows the modular body to conform to chassis that include a cab to an axle/trunnion distance ranging from 84 to 148 inches.

4. The fluid delivery system of claim 1, wherein the modular body is configured to be fastened to a truck chassis for mobile construction type equipment.

5. The fluid delivery system of claim 1, wherein the fluid vessels are rectilinear and are arranged such that a face of each of the fluid vessels is substantially coextensive with a complementary face of another of the fluid vessels.

6. The fluid delivery system of claim 1, wherein one of the fluid vessels stores oil for delivery therefrom, and wherein another of the fluid vessels stores used oil for delivery thereto.

7. The fluid delivery system of claim 1, wherein the a main platform comprises side panels defining an interior of the main platform, wherein the fluid vessels are positioned within the interior of the main platform, and wherein the main platform further comprises a door providing admission to the interior of the main platform to access the fluid vessels.

8. The fluid delivery system of claim 7, wherein the additional fluid vessels of the auxiliary platform are accessible from the interior of the main platform through an open section at the front of the main platform.

9. The fluid delivery system of claim 8, wherein the main platform further comprises a compartment integrated with the side panels and accessible from outside the main platform.

10. The fluid delivery system of claim 9, wherein the compartment serves as part of the securing structure, and wherein one of the fluid vessels contacts the compartment.

11. The fluid delivery system of claim 9, wherein the fluid vessels of the main platform are arranged side-by-side in a first direction, and wherein the additional fluid vessels of the auxiliary platform are arranged side-by-side in a second direction that is orthogonal to the first direction.

12. The fluid delivery system of claim 7, further comprising:
a control panel providing a user the ability to control features of the fluid delivery system without requiring the user to enter the main platform.

13. The fluid delivery system of claim 12, wherein the rear of the main platform comprises an opening through which the fluid transfer apparatuses may be accessed, and wherein the control panel is affixed to the rear of the main platform.

14. The fluid delivery system of claim 1, wherein the wheel well opening is configured for a single-rear-axle vehicle and is substantially centered upon the lengthwise center of the main platform.

15. The fluid delivery system of claim 1, wherein auxiliary platform increases the length of the modular body beyond that of the length of the main platform.

16. The fluid delivery system of claim 15, wherein the auxiliary platform is configured to be fastened to the chassis side-by-side with the main platform.

17. The fluid delivery system of claim 16, wherein the front portion of the main platform and the auxiliary platform face one another and are substantially coextensive.

18. A vehicle comprising:
a vehicle body support structure;
surface engaging members coupled to the vehicle body support structure;
a modular body coupled to the vehicle body support structure and oriented along a plane generally parallel to a chassis plane of the vehicle body support structure, wherein the modular body includes a main platform comprising:
side panels defining an interior of the main platform,
fluid vessels positioned within the interior of the main platform,
a side door providing admission to the interior of the main platform to access the fluid vessels, and
a walkway extending from the side door in the interior of the main platform;
a securing structure supporting the fluid vessels along a surface of the main platform, wherein the securing structure comprises support members secured to the main platform, and wherein each support member extends along a corresponding one of the fluid vessels;
fluid transfer apparatuses associated with the fluid vessels, wherein the main platform further comprises a rear opening through which the fluid transfer apparatuses may be accessed; and
pumps associated with the fluid transfer apparatuses to facilitate movement of fluid through the fluid transfer apparatuses, wherein the pumps and the fluid transfer apparatuses pump fluids out of one of the fluid vessels; and wherein the pumps and the fluid transfer apparatuses suction used fluids into another of the fluid vessels.

19. The vehicle of claim 18,
wherein the modular body further includes a compartment positioned on at least one of a side, a front, and a rear of the modular body,
wherein the compartment serves as part of the securing structure, and
wherein one of the fluid vessels contacts the compartment.

20. The vehicle of claim 18, wherein the fluid vessels are rectilinear and are arranged such that a face of each of the fluid vessels is substantially coextensive with a complementary face of another of the fluid vessels.

21. The vehicle of claim 18, further comprising
an auxiliary platform oriented along a plane generally parallel to the chassis plane of the vehicle body support structure,
wherein the auxiliary platform includes additional fluid vessels, and
wherein the auxiliary platform connects to a front portion of the main platform.

22. The vehicle of claim 21, wherein the additional fluid vessels of the auxiliary platform are accessible from the interior of the main platform through an open section at the front of the main platform.

23. The vehicle of claim 22, further comprising:
a control panel providing a user the ability to control features of the vehicle without requiring the user to enter the main platform.

24. The vehicle of claim 23, wherein the control panel is affixed to the rear of the main platform.

25. The vehicle of claim 18, wherein the fluid vessels of the main platform are arranged on a side of the walkway opposite to the side door.

* * * * *